US011988340B2

(12) United States Patent
Foster et al.

(10) Patent No.: US 11,988,340 B2
(45) Date of Patent: May 21, 2024

(54) CRYOGENIC COOLING SYSTEM WITH VENT

(71) Applicant: OXFORD INSTRUMENTS NANOTECHNOLOGY TOOLS LIMITED, Oxon (GB)

(72) Inventors: Tim Foster, Abingdon (GB); Neil Clarke, Abindgon (GB)

(73) Assignee: Oxford Instruments Nanotechnology Tools Limited, Oxon (GB)

( * ) Notice: Subject to any disclaimer, the term of this patent is extended or adjusted under 35 U.S.C. 154(b) by 345 days.

(21) Appl. No.: 17/636,801

(22) PCT Filed: Jul. 10, 2020

(86) PCT No.: PCT/GB2020/051670
§ 371 (c)(1),
(2) Date: Feb. 18, 2022

(87) PCT Pub. No.: WO2021/032944
PCT Pub. Date: Feb. 25, 2021

(65) Prior Publication Data
US 2022/0333740 A1 Oct. 20, 2022

(30) Foreign Application Priority Data
Aug. 20, 2019 (GB) ...................................... 1911917

(51) Int. Cl.
*F17C 3/08* (2006.01)
*F25D 3/10* (2006.01)

(52) U.S. Cl.
CPC ................ *F17C 3/085* (2013.01); *F25D 3/10* (2013.01)

(58) Field of Classification Search
CPC .... F25D 3/10; F17C 3/085; F17C 2205/0176; F17C 2205/0332;
(Continued)

(56) References Cited

U.S. PATENT DOCUMENTS

2012/0011859 A1* 1/2012 Black ...................... F25D 19/00 62/48.1

FOREIGN PATENT DOCUMENTS

GB 2 547 720 A 8/2017

OTHER PUBLICATIONS

Pangelis et al., "Safety interlock and vent system to alleviate potentially dangerous ice blockage of top-loading cryostat sample sticks", Journal of Applied Crystallography, vol. 46, No. 4, Jun. 22, 2013, pp. 1236-1239.
(Continued)

*Primary Examiner* — Cassey D Bauer
(74) *Attorney, Agent, or Firm* — Blank Rome LLP

(57) ABSTRACT

A cryogenic cooling system is provided having a vessel, the vessel comprising extending along a longitudinal axis and configured to receive a sample probe movable along the longitudinal axis. One or more cooling members are thermally coupled to the vessel so as to produce a thermal gradient along the longitudinal axis of the vessel. A vent extends along the outside of the vessel and is configured to provide a pathway for a flow of gas from an inlet of the vent to an outlet of the vent. The inlet is in gaseous communication with the inside of the vessel and the outlet is in gaseous communication an environment external to the vessel. The inlet is arranged at a position along the vessel configured to obtain a temperature below 63 kelvin during operation of the one or more cooling members, and the outlet is arranged at a position configured to maintain a temperature above 273 kelvin when the outlet has a temperature below 63 kelvin. The vent further comprises a pressure relief element configured to open and close said pathway in dependence on the pressure within the vessel such that, when the pressure of a gas inside the vessel exceeds a safety threshold, the pressure relief element is
(Continued)

opened so as to enable a flow of said gas from the inside of the vessel to the environment external to the vessel.

20 Claims, 4 Drawing Sheets

(58) Field of Classification Search
CPC ........... F25B 2309/00–2309/1428; F25B 9/10; G01R 33/31
See application file for complete search history.

(56) References Cited

OTHER PUBLICATIONS

N. N.: "Sc OptistatSXM TM Creating environments for physical sciences Product Guide", Dec. 21, 2015, Retrieved from the Internet, URL:http://www.labis.pl/resources/image/2015/karty/oxford/Optistat_SXM.pdf.
International Preliminary Report on Patentability dated Apr. 8, 2021.

* cited by examiner

CRYOGENIC COOLING SYSTEM WITH VENT

This application is a U.S. national stage application based on International Application No. PCT/GB2020/051670, filed Jul. 10, 2020, which claims priority to Great Britain Patent Application No. 1911917.1, filed Aug. 20, 2019, both of which are herein incorporated by reference in their entirety.

FIELD OF THE INVENTION

The present invention relates to a cryogenic cooling system comprising a vessel into which a sample probe may be inserted. In particular, the invention provides a vent for preventing a high pressure build-up from occurring within such a vessel.

BACKGROUND TO THE INVENTION

Cryogenic cooling systems commonly incorporate a vessel into which a sample probe (sometimes referred to as a "sample rod") can be inserted. The sample probe may comprise low temperature apparatus, such as a dilution refrigerator or a helium-3 refrigerator. The vessel may be referred to as an "variable temperature insert" (VTI), which provides an experimental space in which the temperature may be varied and controlled (typically between around 1.5K and 300K). The VTI may be fixed within the cryogenic cooling system or removable from it. A sample may be attached to the sample probe and inserted into the vessel. The vessel is then cooled by operation of one or more cooling members so that low temperature experiments can be performed on the sample.

A sealing member is typically provided to prevent the ingress of any unwanted fluids into the vessel when the sample probe is positioned within the vessel. However, even when such a sealing member is provided, gaseous contaminants (typically air and moisture) may nonetheless be introduced into the vessel, either due to a failure of this seal or as a result of the sample loading process. These contaminants may then be caused to freeze at particular locations along the vessel having a temperature equal or below the freezing point of the respective components of the contamination.

The introduction of such contaminants into the vessel, and their subsequent freezing, can create a significant safety concern. For example, any nitrogen within the vessel will generally solidify at a position which first cools to the freezing point of nitrogen (about 63 kelvin). This frozen nitrogen may form a barrier within the vessel that fluidly separates a low temperature end of the vessel from a high temperature end of the vessel. When the low temperature end is later heated, for example, to enable removal of the sample probe, any liquids present may evaporate and increase significantly in volume. If the low temperature end is fluidly separated from the high temperature end, this can result in a dangerously high build-up of pressure occurring at the low temperature end of the vessel (i.e. in excess of normal operating parameters). This pressure, if not relieved, can cause the sample probe to be ejected from the system or components of the system to rupture. As well as causing damage to the system this can present a significant safety risk for any nearby operators.

One technique for mitigating this risk is proposed by "Safety interlock and vent system to alleviate potentially dangerous ice blockage of top-loading cryostat sample sticks", Pangelis et al, Journal of Applied Crystallography 46 (4), 1236-1239 (hereinafter "Pangelis"). In this paper it is proposed that a vent may be coupled to the sample probe by a plurality of radiation baffles provided along the probe. The vent extends along the sample probe so that a proximal end of the vent is arranged within the ambient environment and a distal end of the vent is arranged within the low temperature end of the vessel. A pressure relief valve, provided at the proximal end of the vent, opens in response to the pressure within the low temperature end of the vessel exceeding a predetermined threshold. The vent therefore provides a pathway for gas to travel from the inside of the vessel to the outside of the vessel, thereby preventing a dangerously high build-up of pressure from occurring within the vessel.

Although the mechanism proposed by Pangelis is effective, sample probes are often not provided with such vents. It is therefore reliant on the user to realise that a vent should be fitted to the sample probe before use or ensure there is no possibility of leaks into the vessel. In some instances the design of the sample probe may make it impractical or impossible to attach a vent. It is therefore desirable to provide a more reliable safety mechanism for use in cryogenic cooling systems.

SUMMARY OF THE INVENTION

An aspect of the invention provides a cryogenic cooling system comprising:

- a vessel extending along a longitudinal axis, wherein the vessel is configured to receive a sample probe movable along the longitudinal axis;
- one or more cooling members thermally coupled to the vessel so as to produce a thermal gradient along the longitudinal axis of the vessel; and
- a vent extending along the outside of the vessel, the vent configured to provide a pathway for a flow of gas from an inlet of the vent to an outlet of the vent, wherein the inlet is in gaseous communication with the inside of the vessel, and wherein the outlet is in gaseous communication an environment external to the vessel, wherein the inlet is arranged at a position along the vessel configured to obtain a temperature below 63 kelvin during operation of the one or more cooling members, and wherein the outlet is arranged at a position configured to maintain a temperature above 273 kelvin when the outlet has a temperature below 63 kelvin, the vent further comprising a pressure relief element configured to open and close said pathway in dependence on the pressure within the vessel such that, when the pressure of a gas inside the vessel exceeds a safety threshold, the pressure relief element is opened so as to enable a flow of said gas from the inside of the vessel to the environment external to the vessel.

The vent provides a pathway along which a gas may flow out of the vessel in the event that the pressure of a gas within the vessel exceeds the safety threshold. Such a pressure build-up could occur in response to the formation of ice or other solid contaminants separating two regions inside the vessel and the subsequent evaporation of liquid within one of these regions, as earlier discussed. A particular advantage is provided in that the vent extends along the outside of the vessel. The vent therefore provides a safety mechanism for the vessel which is independent of the sample probe or any other instrument that may be inserted into the vessel. The user is hence afforded greater flexibility in terms of which sample probes may be used in combination with the vessel, and is not required to fit a vent to the sample probe in order to ensure that the system is adequately protected from the risks associated with high pressures occurring within the vessel. The cryogenic cooling system is made inherently safe in this regard, irrespective of the choice of sample probe. Furthermore, by providing the vent external to the vessel, more space is made available within the vessel for other components, such as which may be fitted to the sample probe, such as wiring, co-axial cables, fibre optics, electrical connectors etc.

One or more cooling members are thermally coupled to the vessel so as to produce a thermal gradient along the longitudinal axis of the vessel, wherein the inlet is arranged at a position along the vessel configured to obtain a temperature below 63 kelvin during operation of the one or more cooling members, and wherein the outlet is arranged at a position configured to maintain a temperature above 273 kelvin when the inlet has a temperature below 63 kelvin. Nitrogen will generally freeze at a particular position along the vessel configured to first obtain a temperature of 63 kelvin. Ice will typically not be formed in substantial quantities at regions of the vessel configured to obtain a lower temperature than this position, or at any position along the vent. Therefore, by arranging the inlet of the vent at a position configured to obtain a position below 63 kelvin during operation of the one or more cooling members, an escape path is provided to prevent a dangerously high build-up of pressure from occurring within the vessel.

Unwanted thermal acoustic oscillations ("TAOs") may be induced in accordance with the magnitude of the thermal differential across the vent and its diameter. It is therefore desirable to limit this thermal differential. The inlet is therefore preferably arranged at a position configured to maintain a temperature above 30 kelvin during operation of the one or more cooling members. Most typically the inlet is arranged at a position configured to obtain a temperature of around 50 kelvin (for example to within 5 kelvin) during operation of the one or more cooling members. However the inlet may alternatively be arranged at a position along the vessel configured to obtain a temperature below 30 kelvin, preferably below 5 kelvin, during operation of the one or more cooling members. Such an arrangement is particularly desirable where the TAOs are mechanically dampened.

The cryogenic cooling system is preferably suitable for performing low temperature experiments upon a sample introduced to the vessel by the sample probe. A portion of the vessel is preferably therefore configured to obtain a temperature below 5 kelvin by operation of the one or more cooling members. Such temperatures may be obtained by the use of a cryogenic fluid, for example in combination with a needle valve or a pulse tube refrigerator The cryogenic cooling system may, in principle, derive its cooling power from the use of liquid cryogens, for example stored within a cryogen vessel (also referred to herein as a "dewar"). A cryogen vessel forming a reservoir of liquid cryogen may therefore form at least one of the one or more cooling members. However, typically at least one of the one or more cooling members comprises a cooled stage of a mechanical refrigerator. In the event that the mechanical refrigerator is a two-stage refrigerator, each stage may form one of the cooling members respectively. Suitable mechanical refrigerators include pulse tube refrigerators, Sterling coolers and Gifford-McMahon coolers.

The one or more cooling members could be thermally coupled to the vessel by a heat switch, such as a gas gap heat switch operatively connected to a sorption pump. However more typically the one or more cooling members are thermally coupled to the vessel by a coolant conduit configured to provide a flow of a coolant from the one or more cooling members to the vessel. This coolant conduit may be operated so as to control the heat flow from the one or more cooling members to the vessel. The coolant conduit may form a circuit configured to circulate the coolant in a loop, as may typically occur when the one or more cooling members comprise a cooled stage of a mechanical refrigerator. The one or more cooling members are preferably thermally coupled to the vessel by a heat exchanger, which may form a coiled portion of the coolant conduit. A heating element may also be provided along the vessel, preferably proximal to the heat exchanger, to enable further control of the temperature of the vessel.

A needle valve may be arranged along the coolant conduit for controlling the flow of the coolant from the one or more cooling members to the heat exchanger. This enables precise control of the coolant flow, which is useful for accurate regulation of the temperature along the vessel. A needle valve may also be operated so as to apply further cooling to the coolant due to thermostatic expansion of the coolant. A variety of cryogenic fluids could be used for the coolant however preferably the coolant comprises helium. The needle valve and/or the heating element may be operated in accordance with feedback provided from one or more temperature sensors arranged along the vessel so that a target temperature may be achieved at the vessel.

It is particularly desirable that the coolant conduit comprises a return conduit surrounding at least a portion of the vessel and extending in a direction parallel to the longitudinal axis of the vessel, the return conduit configured to provide a flow of the coolant along the outside of the vessel. An effective, high cooling power may hence be provided to the outside of the vessel. The vent may extend substantially along the inside of the return conduit. The flow of the coolant along the return conduit may therefore limit any thermal leaks provided by the vent. Alternatively the vent may extend substantially along the outside of the return conduit. For example, the vent may extend within a vacuum environment.

It is desirable that the vent extends substantially in a direction parallel to the longitudinal axis of the vessel. The vent may hence extend along the thermal gradient of the vessel, thereby limiting the introduction of any unwanted heat into the vessel.

The outlet is preferably in gaseous communication with the ambient environment surrounding the cryogenic cooling system. Any high pressure flow of gas from the vessel may hence be safely expelled from the cryogenic cooling system to the surrounding atmosphere using the vent. The outlet may also be arranged at a position configured to maintain a temperature approximately equal to the ambient environment during operation of the cryogenic cooling system (and, in particular, the one or more cooling members). For example, the outlet may be within 10 kelvin of the ambient environment (which is at room temperature).

The vent advantageously comprises a pressure relief element which is opened in response to the pressure within the vessel exceeding a safety threshold. It is particularly desirable that the safety threshold is a pressure exceeding atmospheric pressure but below a pressure where components in the sample space might be damaged or the sample probe ejected. This ensures that the vent is kept closed unless there is a build-up of pressure within the vessel requiring relief. Gas is thereby prevented from entering the vessel along the vent, which could otherwise cause the formation of ice within the vessel once cooled. The flow of gas along the vent may hence be one-directional only. The pressure relief element preferably comprises a rupture disc or a relief valve for achieving this function. Furthermore, the pressure relief element is preferably arranged proximal to the outlet. In particular the pressure relief element may be arranged at a position along the vent configured to maintain a temperature above 273 kelvin during operation of the cryogenic cooling systems (and, in particular, the one or more cooling members). It is desirable to arrange the pressure relief element at a position having a temperature above the freezing point of water in this manner so as to ensure reliable operation of the pressure relief element.

The cryogenic cooling system preferably further comprises a sealing member configured to form a hermetic seal between the sample probe and the vessel. This prevents the ingress of gas, such as air, into the vessel which could lead to the formation of ice within the vessel once cooled. The vent advantageously provides a fail-safe mechanism to alleviate any high pressure gas that could form with the vessel if the sealing member were to leak.

BRIEF DESCRIPTION OF THE DRAWINGS

Embodiments of the invention will now be discussed with reference to the accompanying drawings, in which.

DETAILED DESCRIPTION

Figure 1:
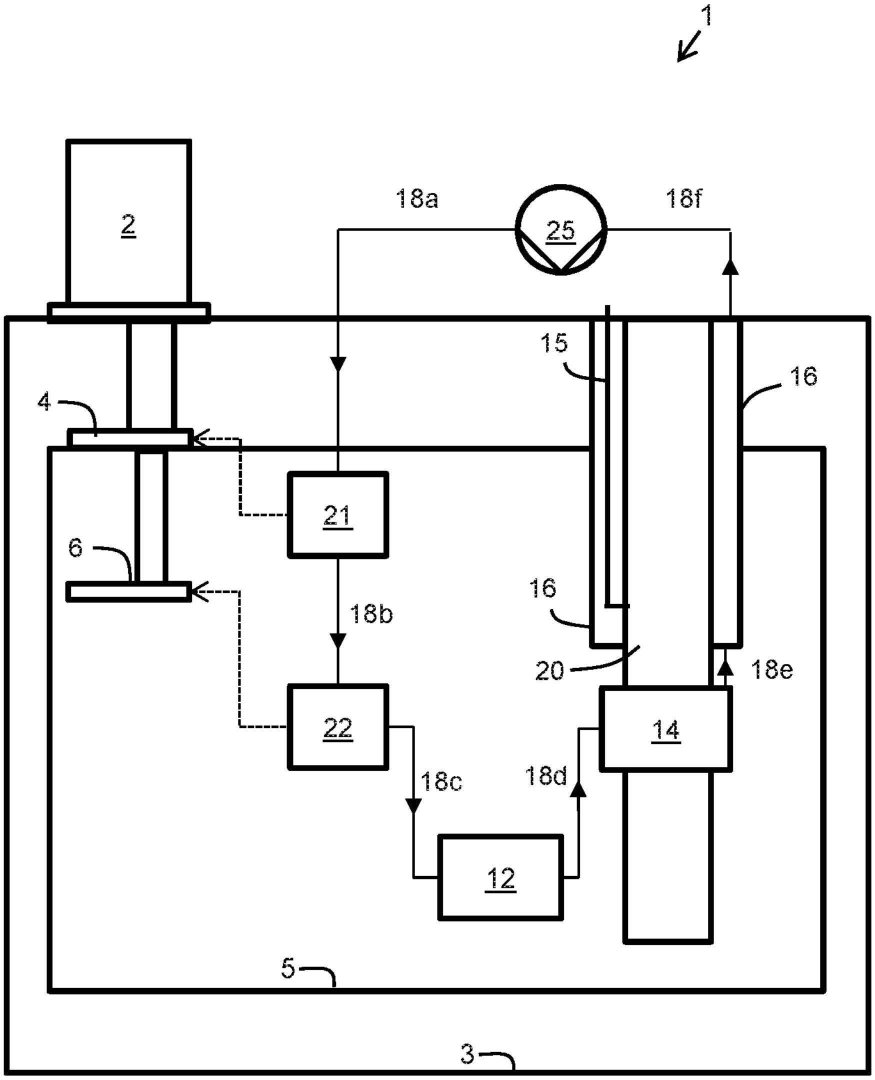
FIG. 1 is a first schematic illustration of a cryogenic cooling system in accordance with a first embodiment.
Figure 2:
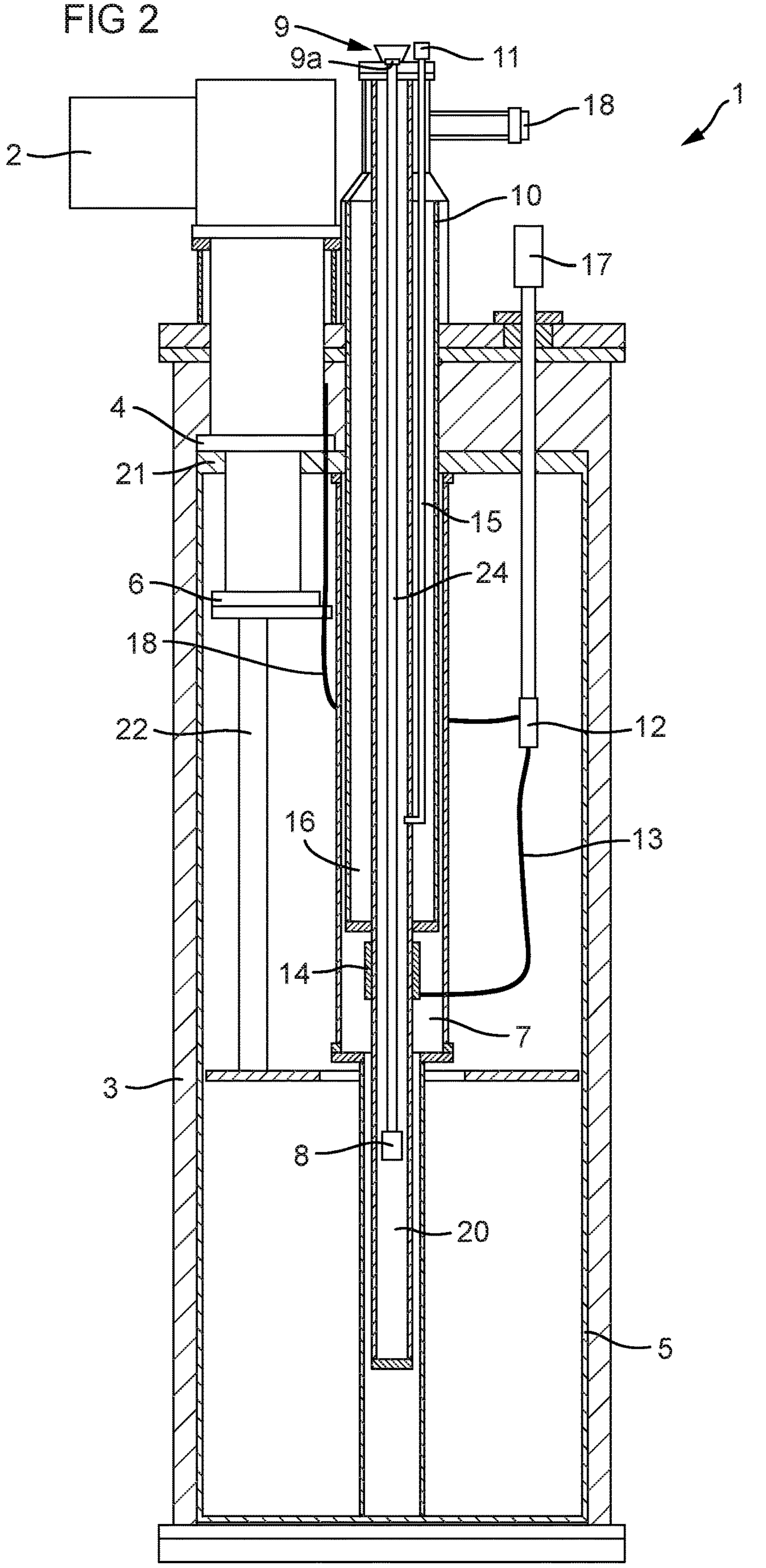
FIG. 2 is a second schematic illustration of a cryogenic cooling system in accordance with the first embodiment.

A first embodiment of a cryogenic cooling system 1 is shown by FIG. 1. An alternative view of the system 1 is provided by FIG. 2 in which additional features have been shown that were omitted from FIG. 1 for sake of clarity. Both FIGS. 1 and 2 provide schematic sectional views of the interior of the system 1. The system 1 comprises a cryostat having an outer chamber 3 within which a radiation shield 5 is provided. Cryostats are well known in the art and are used to provide low temperature environments. The outer chamber 3 is evacuated when in use, this being to improve its thermal performance by the removal of convective and conductive heat paths through any gas within the system 1. The radiation shield 5 further reduces the ingress of thermal radiation into the system 1 from the outside environment. The system 1 is "cryogen-free" in that it does not contain a reservoir of a liquid cryogen for generating cooling power. However, as will be explained, a cryogenic fluid is still provided to assist with heat transfer within the system 1.

The main cooling power of the system 1 is provided by a mechanical refrigerator (these also being referred to in the art as "cryocoolers") which extends into the outer chamber 3 and the radiation shield 5. In the present case, the mechanical refrigerator takes the form of a pulse tube refrigerator (PTR) 2. PTRs are also known for use in cryogen-free applications and typically provide cooling power at one or more low temperature stages within the system 1. In the present case, the PTR 2 cools a first stage 4 of the PTR to about 50-70 kelvin. The first stage 4 is mounted onto the outside of the radiation shield 5. The radiation shield 5 therefore adopts a temperature of around 50-70 kelvin upon operation of the PTR 2. The second stage 6 is mounted within the radiation shield 5 and may be cooled by the PTR 2 to about 3-5 kelvin. A variable temperature insert 10 extends through an upper surface of the outer chamber 3 and into the region of the system 1 surrounded by the radiation shield 5. In the present embodiment, the insert 10 is fixed within the system 1 however the insert may alternatively be removable from it. The insert 10 provides a generally elongate structure within which an elongate vessel 20 is formed. This vessel 20 and the insert 10 extend along a common longitudinal axis (not shown in FIGS. 1 and 2 but later indicated in FIGS. 3-5).

A port 9 is provided at the uppermost surface of the vessel 20 into which a sample probe 24 may be inserted, along the longitudinal axis of the vessel 20. The system 1 therefore corresponds to a "top-loading" system. A sealing member 9*a* is provided around the port 9 so as to produce a hermetic seal between the inside of the vessel 20 and the ambient environment surrounding the system 1 when the sample probe 24 is positioned within the vessel 20. A sample 8 is attached to a distal end of the sample probe 24 for insertion into a low temperature region of the insert 10.

A circuit is provided for flowing a coolant around the system 1 so as to provide a heat transfer path between the PTR 2 and the vessel 20. A coolant conduit comprising a first portion 18*a*, second portion 18*b*, third portion 18*c*, fourth portion 18*d*, fifth portion 18*e* and sixth portion 18*f* of a pumping line 18 is thermally coupled to the first stage 4 of the PTR 2 by a first thermal contact 21 (provided between the first and second portions 18*a*, 18*b*). A second thermal contact 22 is provided at another location along the pumping line 18 (between the second and third portions 18*b*, 18*c*) for thermally coupling the pumping line 18 to the second stage 6 of the PTR 2. Each stage 4,6 of the PTR 2 therefore forms a cooling member for cooling the vessel 20. The coolant (in this case helium) is configured to be pumped around the circuit by a pump 25 positioned outside of the outer chamber 3 (and between the sixth and first portions 18*f*, 18*a*). The coolant is pumped around the circuit in the direction shown by the solid arrow heads in FIG. 1. In particular, the fluid is pumped from the first thermal contact 21 to the second thermal contact 22, before then being conveyed along the pumping line 18 to a needle valve 12 that is arranged between the third and fourth portions 18*c*, 18*d* of the pumping line.

The insert 10 comprises an inner chamber 7 which is mounted to a plate forming part of the radiation shield 5. The inner chamber 7 extends along the longitudinal axis of the insert 20. The return conduit 16 is provided within the inner chamber 7 and has an annular structure co-axially arranged around the vessel 20. The inner chamber 7 is evacuated so as to reduce any heat transfer between the return conduit 16 and a lower portion of the vessel 20 protruding from the base of the return conduit 16. Typically inner chamber 7 is at the same pressure as the outer chamber 3 (which is also evacuated). The sample probe 24 is configured such that the sample 8 is positioned within this lower portion of the vessel 20 (outside of the return conduit 16) when the sample probe 24 is fully inserted within the vessel 20.

The first and second thermal contacts are provided outside of the inner chamber 7 and within the radiation shield 5. Heat is typically extracted from the fluid at each of the first and second thermal contacts 21, 22 by the first and second stages 4, 6 respectively, as indicated by the dotted arrow head in FIG. 1. Additional cooling may then be applied by the needle valve 12, which is also arranged inside the radiation shield 5 and outside the inner chamber 7. Needle valves are known in the art and it may be operated to achieve a precise regulation of fluid flow as well as to cause further cooling of a fluid through thermostatic expansion of liquid into vapour, resulting in a liquid/vapour mixture. In this case the needle valve 12 is operated so as to further reduce the temperature of the coolant beyond that achievable using the second stage 6, typically to between 1-2 kelvin. The coolant is then conveyed from the needle valve 12 by the fourth portion 18*d* of the pumping line 18, which also referred to herein as the supply line 18*d*. The supply line 18*d* comprises a coiled portion provided inside the inner chamber 7 and which is coaxially wound around the vessel 20 so as to form a heat exchanger 14. The vessel 20 is cooled by the flow of the coolant around the heat exchanger 14. The coolant is then conveyed by the fifth portion 18*d* of the pumping line 18 away from the heat exchanger 14 and into a return conduit 16.

The needle valve 12 is controlled using a needle valve controller 17 located outside of the outer chamber 3, as shown in FIG. 2. This controls the flow of the coolant through the heat exchanger 14. The needle valve controller 17 may be either mechanically or electronically operated. A temperature sensor and a heating element (not shown) may be provided along the vessel 20, typically proximal to the heat exchanger 14. The heating element and the needle valve controller 17 may be operated based on temperature data received from the temperature sensor so as to obtain a desired temperature along the vessel 20.

A thermal gradient extends along the longitudinal axis of the vessel 20 such that the uppermost portion of the vessel 20 (proximal to the port 9) maintains the highest temperature along the vessel 20 during operation of the PTR 2 (for example between 270-300 kelvin). A portion of the vessel 20 surrounding the heat exchanger 14 (or potentially beneath the heat exchanger 20 if the vessel 20 contains a cryogenic fluid) typically obtains the lowest temperature along the vessel 20 during operation of the PTR 2 (for example between 1-10 kelvin). However the temperature of the vessel 20 may be varied, for example up to 300 kelvin, depending on the experimental application.

The coolant is conveyed from the heat exchanger 14 to a distal (lowermost) end of the return conduit 16. The coolant may boil upon thermal contact with the vessel 20 either at the heat exchanger 14 or within the return conduit 16. The coolant is pumped along the return conduit 16 in a direction parallel to the longitudinal axis of the vessel 20 so as to conduct further heat from the outer wall of the vessel 20. The coolant is then flowed from the return conduit 16 along a sixth portion 18*f* of the pumping line 18 and through the pump 25 before then being returned to the first thermal contact 21. Continuous circulation of the coolant around the circuit is thereby achieved.

In the present embodiment the vessel 20 is filled with gaseous helium when the sample probe 24 is inserted into the vessel 20. Note that this fluid is separate from the coolant circulated by the pump 25. The PTR 2 is then operated and the coolant circulated so as to reduce the temperature of the helium within the vessel 20. This may cause the helium provided within the vessel 20 to liquefy and/or form a superfluid. Other cryogenic fluids may also be used. In an alternative embodiment, the vessel 20 may be substantially evacuated during use.

It is desirable to reduce the presence of any contaminants within the vessel 20 that may solidify by operation of the PTR 2. For example, a problem encountered by some cryogenic cooling systems is that air may be introduced into the vessel containing the sample probe due to a gas leak or by virtue of the sample loading process. Upon operation of the cooling system, the different components of the air may then solidify at the parts of the vessel which first obtain the freezing temperature of the respective components. For example, nitrogen will solidify at a position along the vessel configured to first obtain a temperature of approximately 63 kelvin. The solidified nitrogen may form a fluid barrier along the vessel separating a low temperature end of the vessel from a high temperature end of the vessel. A similar effect may be achieved by moisture originating from humidity in the air, which freezes to form a water ice barrier. When the low temperature end is later warmed, the barrier(s) may give rise to a pressure difference between the high and low temperature ends of the vessel 20, which may cause a rupture or failure of the system. Previous attempts to address this problem have relied on the incorporation of a vent into the sample probe so as to enable gaseous exchange between the low temperature end of the vessel and the ambient environment surrounding the cryogenic cooling system.

In the present embodiment, a vent 15 extends along the outside of the vessel 20 from an outlet arranged outside of the insert 10 (adjacent to the port 9) to an inlet positioned inside the vessel 20 at a location configured to obtain a temperature below 50 kelvin during operation of the PTR 2. In the first embodiment, the vent 15 extends substantially through the return conduit 16 between the inlet and the outlet. However, alternative arrangements for the vent 15 will later be described with reference to the third and fourth embodiments. The vent 15 provides a pathway along which gas may flow from a low temperature end of the vessel 20 in the event of a pressure build-up arising within a low temperature region of the vessel 20. Importantly the inlet is arranged at a location beneath where any frozen nitrogen and water is likely to form. Unwanted thermally-induced oscillations may arise within the vent 15 in accordance with the temperature difference across the vent 15. Such vibrations may transmit heat from the room temperature end to the cold end of the vent 15, thereby inhibiting efficient cooling of the sample 8. It is therefore desirable to limit this temperature differential in order to reduce the amplitude of any such vibrations. In the present embodiment the inlet is arranged at a position along the vessel 20 configured to obtain an inlet temperature of 40 kelvin during steady-state operation of the PTR 2. Additional material may be provided within the vent or surrounding the vent so as to further reduce the amplitude of such oscillations. Oscillations can be mechanically damped by incorporating material within the tube such as PTFE thread, or adding an appropriately sized orifice and buffer volume at the warm end to upset the natural frequency of the system, as discussed in 'Experiments on thermally driven gas oscillations'; Hoffmann et al, vol 18d, issue 8 Cryogenics; August 1973. These additional dampening techniques allow for the positioning of the inlet at positions along the vessel configured to obtain a temperature below 40 kelvin.

A pressure relief element 11 in the form of a rupture disc or relief valve is provided along the vent 15. The pressure relief element 11 is configured so as to close the vent 15 unless the pressure inside the vent 15 exceeds a safety threshold. The safety threshold is typically above atmospheric pressure, for example at 2 ATM. This ensures that any fluid flow that occurs along the vent 15 occurs in a direction away from the vessel 20 rather than into the vessel 20. The introduction of further contaminants and unwanted heat into the vessel 20 is thereby prevented. The pressure relief element 11 is positioned at a location configured to maintain a temperature approximately equal to the ambient environment during operation of the PTR 2 (in this case proximal to the port 9). This ensures that frozen water does not form around or inside the pressure relief element 11 that could otherwise impede the operation of the pressure relief element 11.

The vent 15 therefore provides a failsafe mechanism for the insert 10 so as to prevent system failure resulting from fluid contaminants having frozen along the vessel 20. Importantly, the vent 15 forms part of the insert 10 itself rather than the sample probe 24. The insert 10 is therefore made safe for use with any sample probe including those not already having a vent provided to them. The system 1 and in particular the insert 10 is therefore made safer and more reliable in comparison with the prior art.

Figure 3:
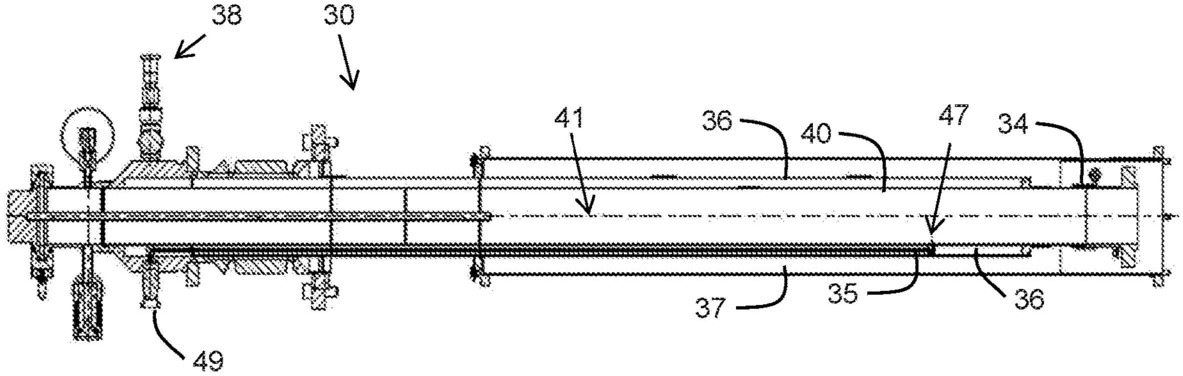
FIG. 3 is a schematic illustration of an insert in accordance with a second embodiment.
Figure 4:
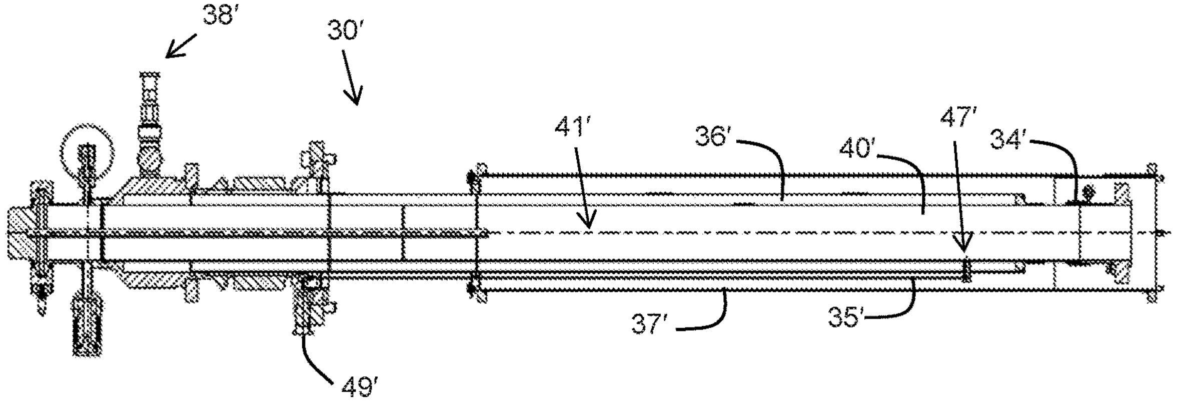
FIG. 4 is a schematic illustration of an insert in accordance with a third embodiment.
Figure 5:
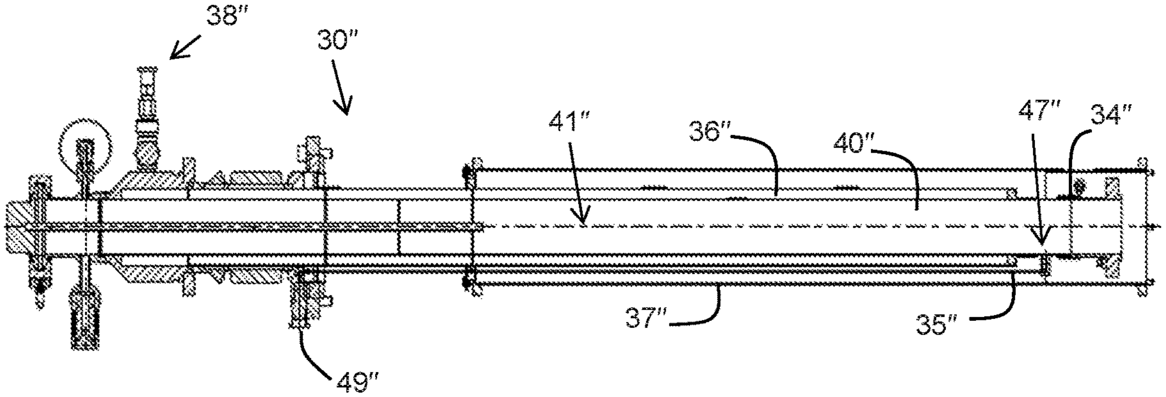
FIG. 5 is a schematic illustration of an insert in accordance with a fourth embodiment.

FIGS. 3, 4 and 5 provide sectional side views of an insert in accordance with second, third and fourth embodiments respectively. The insert may be used in combination with a cryogenic cooling system similar to that described in the first embodiment and shares similar apparatus features as previously described in connection with the first embodiment. With reference to the second embodiment (FIG. 3), it can be seen that the insert 30 comprises an elongate vessel 40 extending along a longitudinal axis 41. The vessel 40 may be cooled by flowing a coolant through a heat exchanger 34 coaxially wound around a distal end of the vessel 40. This coolant may then be conveyed from the heat exchanger 34 into an annular return conduit 36 through to a pumping line 38 provided at the proximal end of the vessel 40. An inner chamber 37 surrounds the distal end of the return conduit 36 and the vessel 40 as occurred in the first embodiment. A vent 35 extends between an inlet 47 arranged within the vessel 40 at a region configured to obtain a temperature below 50 kelvin during operation of the cooling member and an outlet 49 arranged outside of the outer chamber of the cryostat at atmospheric pressure and temperature. The vent 35 extends in a direction parallel to the longitudinal axis 41 so as to reduce any thermal leaks into the vessel 40 from the vent 35. This provides the advantage that the vent 35 is in strong thermal conductivity with the circulating cooling gas in the return conduit 36, and therefore any heat travelling along the vent 35 is intercepted by this gas. In the second embodiment the vent 35 extends in this direction along the return conduit 36.

The third and fourth embodiments show similar features as described above in connection with the second embodiment. Primed reference numerals have been used to show the corresponding apparatus features in the second embodiment and double primed reference numerals have been used to show the corresponding apparatus features in the third embodiment. The third embodiment differs from the first and second embodiments in that the vent 35' extends along the insert 30' in a direction parallel to the longitudinal axis 41' through the inner chamber 37' and outside of the return conduit 36'. However, the inlet 47' of the vent 35' is arranged at a position along the vessel 40' that is surrounded by the return conduit 36'. In particular, the vent 35' extends from the inner chamber 37' through the return conduit 36' in a direction perpendicular to the longitudinal axis 41' so as to terminate within the vessel 40'. The fourth embodiment (FIG. 5) differs from the third embodiment (FIG. 4) in that the inlet 47" is arranged at a position along the vessel 40" that is not surrounded by the return conduit 36". The inlet 47" is instead arranged between the heater exchanger 34" and the return conduit 36" and the vent 35" does not intersect the return conduit 36" at any point. Fewer penetrations are therefore required between the vent 35" and the various vessels relative to the second and third embodiments. Each penetration must be leak tight so providing fewer penetrations means that the apparatus is simpler to manufacture and more robust. The inlet 47" is also arranged at a position configured to obtain a temperature below 3 kelvin (and typically around 1.5 kelvin) when the insert 30" is running at base temperature. In each case, the vent is arranged so as to provide a path for gas to travel from a position inside of the vessel to the atmospheric environment surrounding the cryogenic cooling system in the event that the pressure inside the vessel exceeds a safety threshold.

Figure 6:
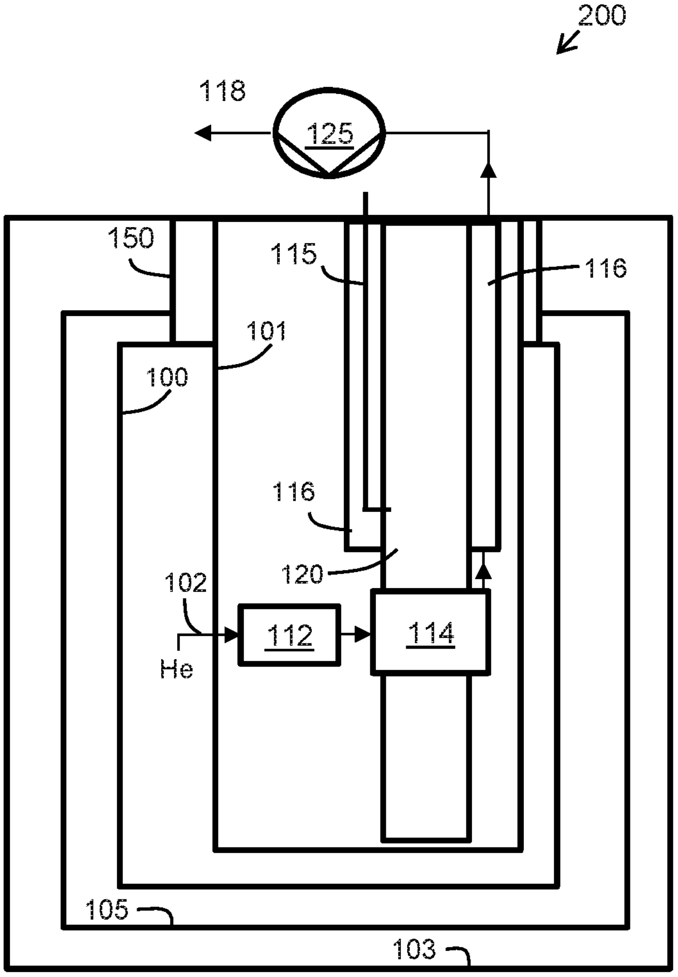
FIG. 6 is a schematic illustration of a cryogenic cooling system in accordance with a fifth embodiment.

Although in the above embodiments the vessel is configured to be thermally coupled to a PTR by use of a coolant circuit, in alternative embodiments the vessel may be thermally coupled to a mechanical refrigerator by other means, such as by a mechanical linking member or a heat switch. In yet further embodiments a thermal gradient may be achieved along the longitudinal axis of the vessel without the use of a mechanical refrigerator. For example, the vessel may be thermally coupled to a reservoir of cryogenic fluid. More particularly, the cryostat may contain a dewar of liquid helium into which the vessel is immersed. One such embodiment will now be discussed with reference to FIG. 6.

A fifth embodiment of the invention provides a system 200 that is similar to the first embodiment 1 except that the cooling power for the insert vessel 120 (forming the sample space) is provided by the flow of helium from a cryogen vessel 100 comprising a reservoir of liquid helium. Unlike the first embodiment, the fifth embodiment may therefore be characterised as a “wet” system and the cryogen vessel 100 forms the “cooling member” for the insert vessel 120. One advantage provided by this embodiment is that the liquid cryogen provides a high cooling power and so the system 200 has a relatively short cool down time. However, such cryogens are also scarce and therefore expensive.

The insert vessel 120 is arranged within an inner vacuum vessel 101, which separates the outside of the insert vessel 120 from the cryogen vessel 100, thereby limiting heat exchange between the insert vessel 120 and the cryogen vessel 100. The inner vacuum vessel 101 is evacuated during use but may be brought to atmospheric pressure, for example using a gate valve (not shown). The insert vessel 120 may then be removed from the inner vacuum vessel 101, for example for maintenance.

The cryogen vessel 101 is arranged inside an outer chamber 103, which is typically evacuated during operation of the system 200. A thermal radiation shield 105 is arranged between the outside of the cryogen vessel 100 and the inside of the outer chamber 103. The thermal radiation shield 105 surrounds the cryogen vessel 100 so as to further reduce any thermal radiation between the cryogen vessel 100 and the environment outside of the outer chamber 103, which is at room temperature.

A cryogen vessel neck 150 forms a rigid body that extends around the outside of the inner vacuum vessel 101, between the upper wall of the cryogen vessel 100 and the upper wall of the outer chamber 103. The thermal radiation shield 105 and the inner vacuum vessel 101 are mounted to the cryogen vessel neck 150 and are thereby held in place within the outer chamber 103.

Liquid helium is flowed through a pick up conduit 102 from an inlet terminating within the cryogen vessel 100 and immersed in liquid helium to a needle valve 112. From here the helium is flowed through a heat exchanger and along a return conduit 116 as occurs in the first embodiment. The helium is then flowed from the return conduit 116 to a position external to the outer chamber 103 along a pumping line 118. A pump 125 is arranged along the pumping line 118 for providing a sub-atmospheric pressure along the pumping line 118 so as to control the flow of the helium from the cryogen vessel 100 and cause evaporative cooling across the needle valve 112. The helium may then be exhausted from the pumping line 118 to atmosphere or transmitted to a helium recovery system (not shown).

As occurs in the first embodiment, a vent 115 extends along the return conduit 116. The vent 115 comprises a pressure relief element (not shown), as described in the previous embodiments. The vent 115 also has an inlet arranged within the insert vessel 120 and an outlet arranged on the outside of the outer chamber 103. The inlet is arranged at a position along the insert vessel 120 configured to obtain a temperature below 63 kelvin during steady state operation when the helium is flowed around the heat exchanger 114 and the insert vessel 120 is at base temperature. The problems previously discussed concerning the formation of ice barriers within the insert vessel 120 can therefore be avoided. Furthermore, because the vent extends along the outside of the insert vessel (in this case through the return conduit 116), the vent therefore provides a safety mechanism for the insert vessel 120 which is independent of the sample probe or any other instrument that may be inserted into the insert vessel 120.

It will be appreciated that the embodiments described above provide a more reliable safety mechanism for use in cryogenic cooling systems.

The invention claimed is:

1. A cryogenic cooling system comprising:

a vessel extending along a longitudinal axis, wherein the vessel is configured to receive a sample probe movable along the longitudinal axis;

one or more cooling members thermally coupled to the vessel so as to produce a thermal gradient along the longitudinal axis of the vessel; and a vent extending along the outside of the vessel, the vent configured to provide a pathway for a flow of gas in one direction only from an inlet of the vent to an outlet of the vent, wherein the inlet is in gaseous communication with the inside of the vessel, and wherein the outlet is in gaseous communication with an environment external to the vessel, wherein the inlet is arranged at a position along the vessel configured to obtain a temperature below 63 kelvin during operation of the one or more cooling members, and wherein the outlet is arranged at a position configured to maintain a temperature above 273 kelvin when the inlet has a temperature below 63 kelvin, the vent further comprising a pressure relief element configured to open and close said pathway in dependence on the pressure within the vessel such that, when the pressure of a gas inside the vessel exceeds a safety threshold, the pressure relief element is opened so as to enable a flow of said gas from the inside of the vessel to the environment external to the vessel.

2. A cryogenic cooling system according to claim 1, wherein the inlet is arranged at a position along the vessel configured to maintain a temperature above 30 kelvin during operation of the one or more cooling members.

3. A cryogenic cooling system according to claim 1, wherein the inlet is arranged at a position along the vessel configured to obtain a temperature below 30 kelvin, during operation of the one or more cooling members.

4. A cryogenic cooling system according to claim 1, wherein a portion of the vessel is configured to obtain a temperature below 5 kelvin during operation of the one or more cooling members.

5. A cryogenic cooling system according to claim 1, wherein at least one of the one or more cooling members comprises a cooled stage of a mechanical refrigerator.

6. A cryogenic cooling system according to claim 1, wherein the one or more cooling members are thermally coupled to the vessel by a coolant conduit configured to provide a flow of a coolant from the one or more cooling members to the vessel.

7. A cryogenic cooling system according to claim 6, wherein the coolant conduit comprises a heat exchanger thermally coupling the one or more cooling members to the vessel.

8. A cryogenic cooling system according to claim 7, further comprising a needle valve arranged along the coolant conduit for controlling the flow of the coolant from the one or more cooling members to the heat exchanger.

9. A cryogenic cooling system according to claim 6, wherein the coolant conduit forms a circuit.

10. A cryogenic cooling system according to claim 6, wherein the coolant conduit comprises a return conduit surrounding at least a portion of the vessel and extending in a direction parallel to the longitudinal axis of the vessel, the return conduit configured to provide a flow of the coolant along the outside of the vessel.

11. A cryogenic cooling system according to claim 10, wherein the vent extends substantially along the outside of the return conduit.

12. A cryogenic cooling system according to claim 10, wherein the vent extends substantially along the inside of the return conduit.

13. A cryogenic cooling system according to claim 1, wherein the vent extends substantially within a vacuum environment.

14. A cryogenic cooling system according to claim 1, wherein the vent extends substantially in a direction parallel to the longitudinal axis of the vessel.

15. A cryogenic cooling system according to claim 1, wherein the outlet is in gaseous communication with the ambient environment surrounding the cryogenic cooling system.

16. A cryogenic cooling system according to claim 1, wherein the safety threshold is a pressure exceeding atmospheric pressure.

17. A cryogenic cooling system according to claim 1, wherein the pressure relief element comprises a rupture disc or a relief valve.

18. A cryogenic cooling system according to claim 1, wherein the pressure relief element is arranged at a position along the vent configured to maintain a temperature above 273 kelvin during operation of the cryogenic cooling system.

19. A cryogenic cooling system according to claim 1, further comprising a sealing member arranged to form a hermetic seal between the sample probe and the vessel.

20. A cryogenic cooling system according to claim 1, wherein the vessel is configured to be substantially evacuated in use.

* * * * *